(12) United States Patent
Ito

(10) Patent No.: US 9,513,974 B2
(45) Date of Patent: Dec. 6, 2016

(54) TASK SCHEDULER MECHANISM, OPERATING SYSTEM, AND MULTIPROCESSOR SYSTEM

(71) Applicant: Renesas Electronics Corporation, Kawasaki-shi (JP)

(72) Inventor: Yoshiyuki Ito, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 14/593,941

(22) Filed: Jan. 9, 2015

(65) Prior Publication Data

US 2015/0205644 A1 Jul. 23, 2015

(30) Foreign Application Priority Data

Jan. 21, 2014 (JP) .................................. 2014-008579

(51) Int. Cl.
*G06F 9/00* (2006.01)
*G06F 9/52* (2006.01)

(52) U.S. Cl.
CPC ...................................... *G06F 9/52* (2013.01)

(58) Field of Classification Search
CPC ........................................................ G06F 9/52
USPC ..................................................... 718/1–108
See application file for complete search history.

(56) References Cited

U.S. PATENT DOCUMENTS

| 5,515,538 A | * | 5/1996 | Kleiman | .................. | G06F 9/52 |
| | | | | | 710/260 |
| 7,152,171 B2 | | 12/2006 | Chandley et al. | | |
| 2005/0246563 A1 | * | 11/2005 | Chandley | .............. | G06F 1/3203 |
| | | | | | 713/320 |
| 2006/0064696 A1 | * | 3/2006 | Lin | ........................ | G06F 9/4893 |
| | | | | | 718/100 |
| 2007/0022425 A1 | * | 1/2007 | Jackson | ................ | G06F 9/5027 |
| | | | | | 718/104 |

(Continued)

FOREIGN PATENT DOCUMENTS

| JP | 06-131201 A | 5/1994 |
| JP | 2005-332386 A | 12/2005 |

OTHER PUBLICATIONS

Liu, Chung Laung, and James W. Layland. "Scheduling algorithms for multiprogramming in a hard-real-time environment." Journal of the ASM (JACM) 20.1 (1973): pp. 46-61.*

(Continued)

*Primary Examiner* — Satish Rampuria
(74) *Attorney, Agent, or Firm* — McGinn IP Law Group, PLLC

(57) ABSTRACT

In a multiprocessor system having a high-performance processor and a low-power-consumption processor, tasks are properly assigned to the high-performance processor or to the low-power-consumption processor even if the tasks include those commonly used by a plurality of applications. The applications each include a plurality of tasks that are driven by an input or sequentially driven by another task. A task scheduler mechanism includes a synchronization mechanism that causes a driven task to inherit a priority assigned to the input or a synchronizing task, and a task assignment mechanism that determines in accordance with the inherited priority whether to assign the driven task to the high-performance processor or to the low-power-consumption processor.

10 Claims, 9 Drawing Sheets

(56) References Cited

U.S. PATENT DOCUMENTS

2008/0127192 A1* 5/2008 Capps .................. G06F 1/3203
718/103
2013/0104131 A1* 4/2013 Fujita ..................... G06F 9/505
718/101

OTHER PUBLICATIONS

Malone, Thomas W., Richard E. Fikes, and Michael T. Howard. "Enterprise: A market-like task scheduler for distributed computing environments." (1983), pp. 1-46.*
Drabowski, Mieczyslaw, and Jan Weglarz. "Scheduling multiprocessor tasks to minimize schedule length." Computers, IEEE Transactions on 100.5 (1986): pp. 389-393.*

* cited by examiner

TASK SCHEDULER MECHANISM, OPERATING SYSTEM, AND MULTIPROCESSOR SYSTEM

CROSS-REFERENCE TO RELATED APPLICATIONS

The disclosure of Japanese Patent Application 2014-008579 filed on Jan. 21, 2014 including the specification, drawings, and abstract is incorporated herein by reference in its entirety.

BACKGROUND

The present invention relates to a task scheduler mechanism, an operating system incorporating the task scheduler mechanism, and a multiprocessor system in which the task scheduler mechanism and the operating system are operative. More specifically, the present invention is preferably applicable to task assignment for dynamically using a high-performance processor or low-power-consumption processor included in the multiprocessor system.

An operating system (OS) for a symmetric multiprocessor (SMP) is incorporated in a multiprocessor system to exercise task management. In a situation where the multiprocessor system includes a high-performance processor and a low-power-consumption processor, it is demanded that a task be properly assigned to determine which processor executes the task in consideration of the balance between performance and power consumption.

A technology described in Japanese Unexamined Patent Application Publication No. 2005-332386 performs load balancing of services in accordance with processing power consumption requirements in a personal computer including a main system and an auxiliary system. When an application is to be executed, a processor manager determines the load currently imposed on the main system and references a list of operating components (for example, an optical drive, a disk drive, and an encoder/decoder). If the application is a simple, low-intensive task, the processor manager switches to the auxiliary system. If the application is an intensive task, the processor manager switches to the main system.

A technology described in Japanese Unexamined Patent Application Publication No. Hei 06 (1994)-131201 manages task priorities by using a table and dynamically manipulates the task priorities to perform scheduling in consideration, for instance, of user demands and the amount of time available before completion of task processing.

SUMMARY

Studies conducted about Japanese Unexamined Patent Application Publications No. 2005-332386 and No. Hei 06 (1994)-131201 by the inventors of the present invention revealed that the following problems exist.

It was found that no consideration is given to whether a task commonly used by a plurality of applications executed by a multiprocessor system including a high-performance processor and a low-power-consumption processor should be assigned to the high-performance processor or to the low-power-consumption processor.

According to the technology described in Japanese Unexamined Patent Application Publication No. 2005-332386, the processor manager exercises control while determining whether a task initiated by an application should be executed by the main system or by the auxiliary system depending on whether the application is intensive and requires a high-performance process or is non-intensive. Therefore, if control is exercised to use the auxiliary system to execute a task that is included in an intensive application and in a non-intensive application, the intensive application may fail to deliver expected performance. Further, if control is exercised to use the main system to execute all applications including the task as intensive applications in order to avoid the above problem, an extra amount of electrical power is consumed.

According to the technology described in Japanese Unexamined Patent Application Publication No. Hei 06 (1994)-131201, scheduling can be performed while dynamically manipulating task priorities on the assumption that, for example, the time required for process completion is predefined in a task itself. Therefore, if a task is commonly included in a plurality of applications that are individually predefined to have specific performance characteristics such as the time required for process completion, the amount of time available for the task cannot be uniformly defined. Consequently, proper control cannot be exercised to determine which processor such a task should be assigned to.

Means for solving the above problems will be described below. Other problems and novel features will become apparent from the following description and from the accompanying drawings.

According to an aspect of the present invention, there is provided a task scheduler mechanism executed by a multiprocessor system that is capable of executing a plurality of applications and equipped with a high-performance processor and a low-power-consumption processor. The applications each include a plurality of tasks that are driven by an input or sequentially driven by another task. The task scheduler mechanism includes a synchronization mechanism and a task assignment mechanism. The synchronization mechanism causes a driven task to inherit a priority assigned to the input or a driving task. In accordance with the inherited priority, the task assignment mechanism assigns the driven task to the high-performance processor or to the low-power-consumption processor.

The following is a brief description of an advantageous effect achievable by the above-described aspect of the present invention.

Even if a driven task is commonly used by a plurality of applications, it can be properly assigned to a high-performance processor or to a low-power-consumption processor.

BRIEF DESCRIPTION OF THE DRAWINGS

Embodiments of the present invention will be described in detail based on the following figures, in which.

DETAILED DESCRIPTION

1. Overview of Embodiments

Figure 1:
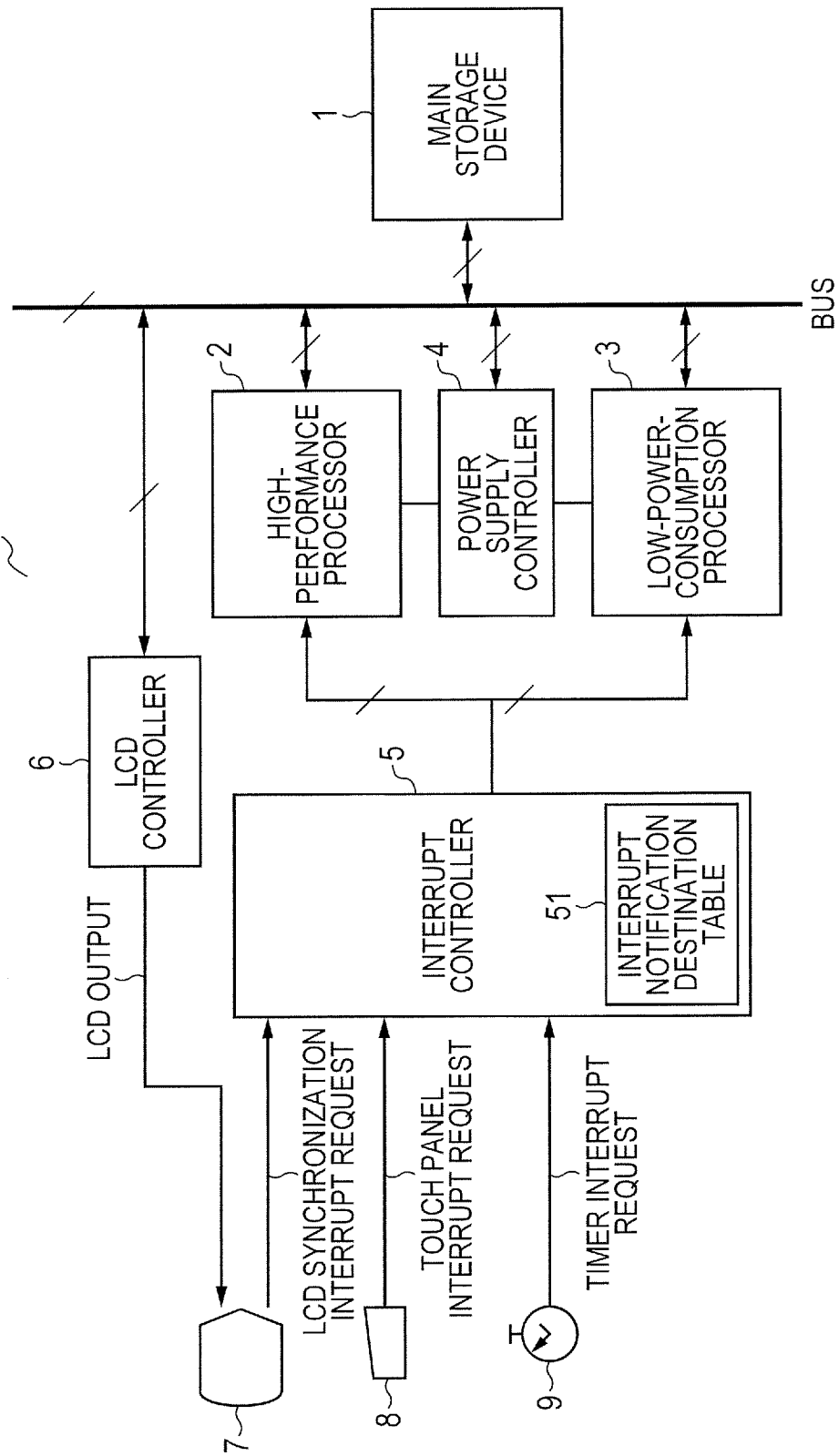
FIG. 1 is a block diagram illustrating an exemplary configuration of a data processing device according to a first embodiment of the present invention.

First of all, representative embodiments of the present invention disclosed in this document will be summarized. The parenthesized reference numerals in the accompanying drawings referred to in the overview of the representative embodiments merely illustrate what is contained in the concept of elements to which the reference numerals are affixed.

[1] <Inheritance of a Priority to a Driven Task>

According to a first aspect of the present invention, there is provided a task scheduler mechanism (200). The task scheduler mechanism (200) is executed by a multiprocessor system (10) that is capable of executing a plurality of applications and equipped with a high-performance processor (2) and a low-power-consumption processor (3). The configuration of the task scheduler mechanism (200) is described below.

The applications each include a plurality of tasks that are driven by an input or sequentially driven by another task.

The task scheduler mechanism (200) includes a synchronization mechanism (210) and a task assignment mechanism (220). The synchronization mechanism (210) causes a driven task to inherit a priority assigned to the input or a synchronizing task. In accordance with the inherited priority, the task assignment mechanism (220) determines whether the driven task is to be assigned to the high-performance processor or to the low-power-consumption processor.

Consequently, even if a driven task is commonly used by a plurality of applications, it can be properly assigned to a high-performance processor or to a low-power-consumption processor.

[2] <Synchronization Mechanism Internal Management Table>

According to a second aspect of the present invention, there is provided the task scheduler mechanism as described in the first aspect. The synchronization mechanism includes a first management table (211) that stores a priority assigned to each task and stores the synchronizing task in association with the driven task. In the first management table, the priority of the driven task is replaced by the priority of the synchronizing task to cause the driven task to inherit the priority assigned to the synchronizing task.

Consequently, the synchronization mechanism can be implemented with ease.

[3] <Sub-Process Group>

According to a third aspect of the present invention, there is provided the task scheduler mechanism as described in the second aspect. The applications each include a sub-process group that includes a plurality of tasks. When the priority of a particular task is to be changed in the first management table, the synchronization mechanism changes the priorities of the other tasks belonging to the same sub-process group as the particular task to the same priority as that of the particular task.

Consequently, the degree of freedom of task assignment timing can be increased.

[4] <Task Formed of a Single Context>

According to a fourth aspect of the present invention, there is provided the task scheduler mechanism as described in the second aspect. The first management table is capable of storing the association between the synchronizing task and the driven task as well as flag information indicating whether the driven task is capable of parallelly operating on a plurality of contexts (212_1 to 212_n).

When assigning a processor to a driven task, the task assignment mechanism references the flag information. If the referenced flag information indicates that the driven task is a task formed of a single context, the task assignment mechanism is capable of exercising control to acquire the operating status of the task. If the task is running, the task assignment mechanism is capable of exercising control to transfer the task from a processor running the task to another processor (S415HL, S415LH, S420H, S420L).

Consequently, when a task formed of a single context is already running in a certain processor, it can be transferred to another processor as needed. This makes it possible to increase the efficiency of task processing.

[5] <Task Assignment in Accordance with the Power/Load Status of the Multiprocessor System>

According to a fifth aspect of the present invention, there is provided the task scheduler mechanism as described in the first aspect. The task assignment mechanism assigns to the high-performance processor or to the low-power-consumption processor in accordance with the inherited priority and with the power and/or load status of the multiprocessor system (S201, S203; S401, S403).

Consequently, the balance between the power consumption and performance of the multiprocessor system can be properly managed.

[6] <Task Assignment Mechanism Internal Management Table>

According to a sixth aspect of the present invention, there is provided the task scheduler mechanism as described in the first aspect. The task assignment mechanism includes a second management table (221) that stores a priority of a driven task in association with an assigned processor, and references the second management table to determine in accordance with a priority inherited by the driven task whether to assign to the high-performance processor or to the low-power-consumption processor (S203; S403).

Consequently, the task assignment mechanism can be implemented with ease.

[7] <Task Assignment Mechanism Internal Management Table=Sixth Aspect+Power/Load Status of System>

Figures 3, 4:
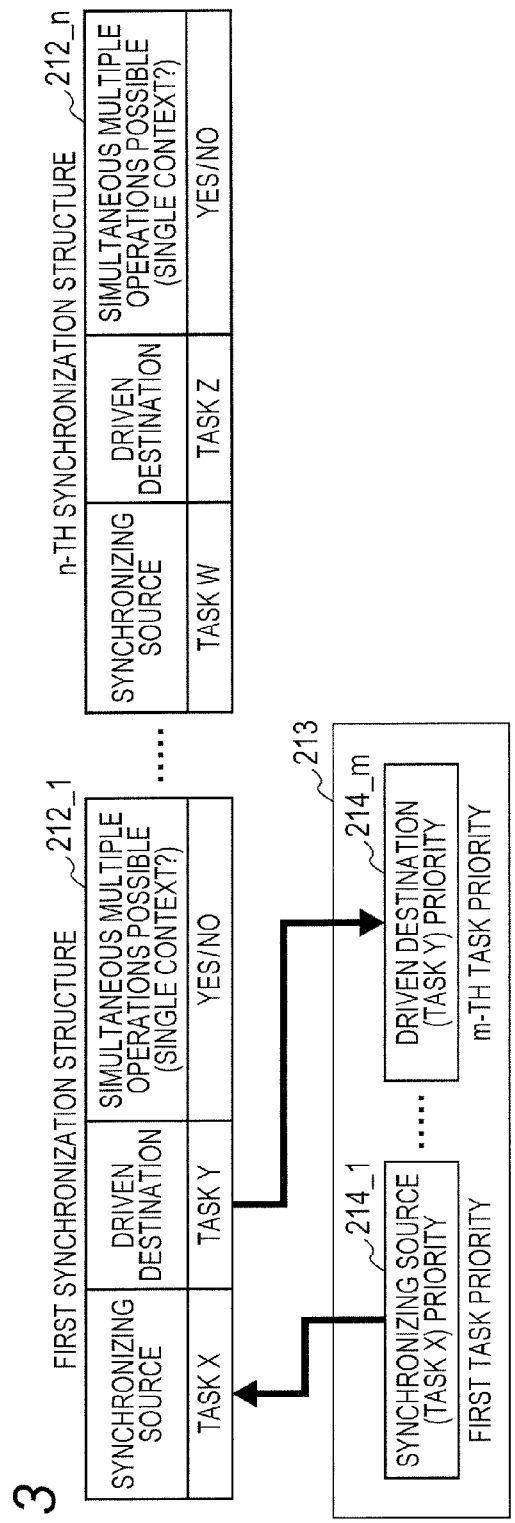
FIG. 3 is an explanatory diagram illustrating an exemplary configuration of a synchronization mechanism internal management table and an operation of a synchronization mechanism.
FIG. 4 is an explanatory diagram illustrating an exemplary configuration of a task assignment mechanism internal management table.

According to a seventh aspect of the present invention, there is provided the task scheduler mechanism as described in the sixth aspect. The second management table stores the assigned processor in association with a combination of the priority of a driven task and the power and/or load status of the multiprocessor system (FIG. 4, 221). The task assignment mechanism references the second management table to assign to the high-performance processor or to the low-power-consumption processor in accordance with the inherited priority and with the power and/or load status of the multiprocessor system (S201, S203; S401, S403).

Consequently, the balance between the power consumption and performance of the multiprocessor system can be properly managed.

[8] <Load Status Monitoring/Report Mechanism and System Power Supply Status Monitoring/Report Mechanism>

According to an eighth aspect of the present invention, there is provided the task scheduler mechanism as described in the seventh aspect. The task scheduler mechanism further includes a load status monitoring/report mechanism (106) and a system power supply status monitoring/report mechanism (107). The load status monitoring/report mechanism monitors the load status of the multiprocessor system and supplies the monitored load status to the task assignment mechanism. The system power supply status monitoring/report mechanism monitors the status of power supply to the multiprocessor system and supplies the monitored power status to the task assignment mechanism.

Consequently, the balance between the power consumption and performance of the multiprocessor system can be properly managed.

[9] <Power Saving Control Mechanism>

According to a ninth aspect of the present invention, there is provided the task scheduler mechanism as described in the eighth aspect. The task scheduler mechanism further includes a power saving control mechanism (700). The power saving control mechanism receives the load status supplied from the load status monitoring/report mechanism and the power status supplied from the system power supply status monitoring/report mechanism, and controls the power-consumption-related operating status of the high-performance processor and/or the low-power-consumption processor in accordance with the load status and with the power status.

Consequently, the balance between the power consumption and performance of the multiprocessor system can be positively controlled.

[10] <Operating System for a Multiprocessor>

According to a tenth aspect of the present invention, there is provided an operating system (100). The operating system (100) includes the task scheduler mechanism described in the first aspect.

Consequently, it is possible to provide an operating system that is used for a multiprocessor and allows even a driven task commonly used by a plurality of applications to be properly assigned to a high-performance processor or to a low-power-consumption processor.

[11] <Multiprocessor System>

According to an eleventh aspect of the present invention, there is provided a multiprocessor system (10). The multiprocessor system (10) includes the task scheduler mechanism described in the first aspect.

Consequently, it is possible to provide a multiprocessor that allows even a driven task commonly used by a plurality of applications to be properly assigned to a high-performance processor or to a low-power-consumption processor.

[12] <Multiprocessor System with a Task Scheduler Mechanism that Inherits a Priority to a Driven Task>

According to a twelfth aspect of the present invention, there is provided a multiprocessor system (10). The multiprocessor system (10) includes a high-performance processor (2), a low-power-consumption processor (3), and a nonvolatile memory, and is capable of executing a plurality of applications (102, 103) and a task scheduler mechanism (200). The configuration of the multiprocessor system (10) is described below.

The applications each include a plurality of tasks that are driven by an input or sequentially driven by another task.

The task scheduler mechanism includes a synchronization mechanism (210) and a task assignment mechanism (220). The synchronization mechanism (210) causes a driven task to inherit a priority assigned to the input or a synchronizing task. In accordance with the inherited priority, the task assignment mechanism (220) determines whether the driven task is to be assigned to the high-performance processor or to the low-power-consumption processor.

The nonvolatile memory stores a program code of each of the applications and a program code of the task scheduler mechanism that are read and executed by the high-performance processor or by the low-power-consumption processor.

Consequently, it is possible to provide a multiprocessor that allows even a driven task commonly used by a plurality of applications to be properly assigned to a high-performance processor or to a low-power-consumption processor. Dependent features described in the first to ninth aspects may also be combined dependently with the twelfth and subsequent aspects to produce the similar advantageous effect.

[13] <Interrupt Controller>

According to a thirteenth aspect of the present invention, there is provided the multiprocessor system as described in the twelfth aspect. The multiprocessor system further includes an interrupt controller (5). The interrupt controller supplies the input to the task scheduler mechanism in accordance with the cause of an interrupt.

Consequently, a series of tasks can be associated with causes of interrupts. This makes it easy to exercise priority management for each interrupt cause.

[14] <Main Storage Device>

According to a fourteenth aspect of the present invention, there is provided the multiprocessor system as described in the twelfth aspect. The multiprocessor system further includes a main storage device (1). The program code of each of the applications and the program code of the task scheduler mechanism are read into the main storage device from the nonvolatile memory and then executable by one of the high-performance processor and the low-power-consumption processor or executable cooperatively by both of them.

Consequently, programs can be read at high speed.

[15] <Single Chip>

According to a fifteenth aspect of the present invention, there is provided the multiprocessor system as described in the twelfth aspect. At least the high-performance processor and the low-power-consumption processor are formed on the same semiconductor substrate.

Consequently, an integrated multiprocessor system is provided. If this aspect is dependent on the thirteenth aspect, the interrupt controller may be additionally formed on the same semiconductor substrate. If this aspect is dependent on the fourteenth aspect, the main storage device may be additionally formed on the same semiconductor substrate. Further, the nonvolatile memory may also be additionally formed on the same semiconductor substrate.

2. Details of Embodiments

Embodiments of the present invention will now be described in further detail.

First Embodiment

FIG. 1 is a block diagram illustrating an exemplary configuration of a data processing device according to a first embodiment of the present invention.

The data processing device 10 is a multiprocessor system that includes a high-performance processor 2 and a low-power-consumption processor 3. The high-performance processor 2 and the low-power-consumption processor 3 are coupled to a common main storage device 1 through a bus. The data processing device 10 further includes an interrupt controller 5. The interrupt controller 5 receives an interrupt request, for instance, from a liquid-crystal display (LCD) 7, a touch panel 8, or a timer 9, which are coupled to the interrupt controller 5, and notifies the high-performance processor 2 or the low-power-consumption processor 3 of the interrupt request. The interrupt controller 5 includes, for example, an interrupt notification destination table 51 and determines, in accordance with the cause of an interrupt, which processor is to be notified of the interrupt request. The data processing device 10 includes, for example, an LCD controller 6, a touch controller (not shown), and the timer 9 as peripheral circuit modules. The LCD controller 6 controls the LCD 7 and outputs data (LCD output) to be displayed. The touch controller controls the touch panel 8 and receives information such as a touch position input from the touch panel 8. The data processing device 10 also includes a power supply controller 4 that controls the supply of electrical power to the high-performance processor 2 and the low-power-consumption processor 3. The power supply controller 4 is capable of exercising control so as to stop the supply of electrical power when bringing the high-performance processor and the low-power-consumption processor to a halt or reduce a power supply voltage when putting them in a standby state. Further, the power supply controller 4 monitors the system power status of the data processing device 10. The system power status is, for example, a state where available electrical power is more than adequate or a state where the supply of electrical power is inadequate. The state where available electrical power is more than adequate is a state where an operation is performed while a battery for a battery-driven system is fully charged or a state where an operation is performed by using commercially available electrical power. The state where the supply of electrical power is inadequate is a state where an operation is performed while the remaining battery power for a battery-driven system is becoming inadequate. For example, the main storage device 1, the high-performance processor 2, the low-power-consumption processor 3, the power supply controller 4, the interrupt controller 5, the LCD controller 6, and the timer 6 are configured as a single-chip integrated circuit by using, for instance, a publicly known semiconductor manufacturing technology.

Figure 2:
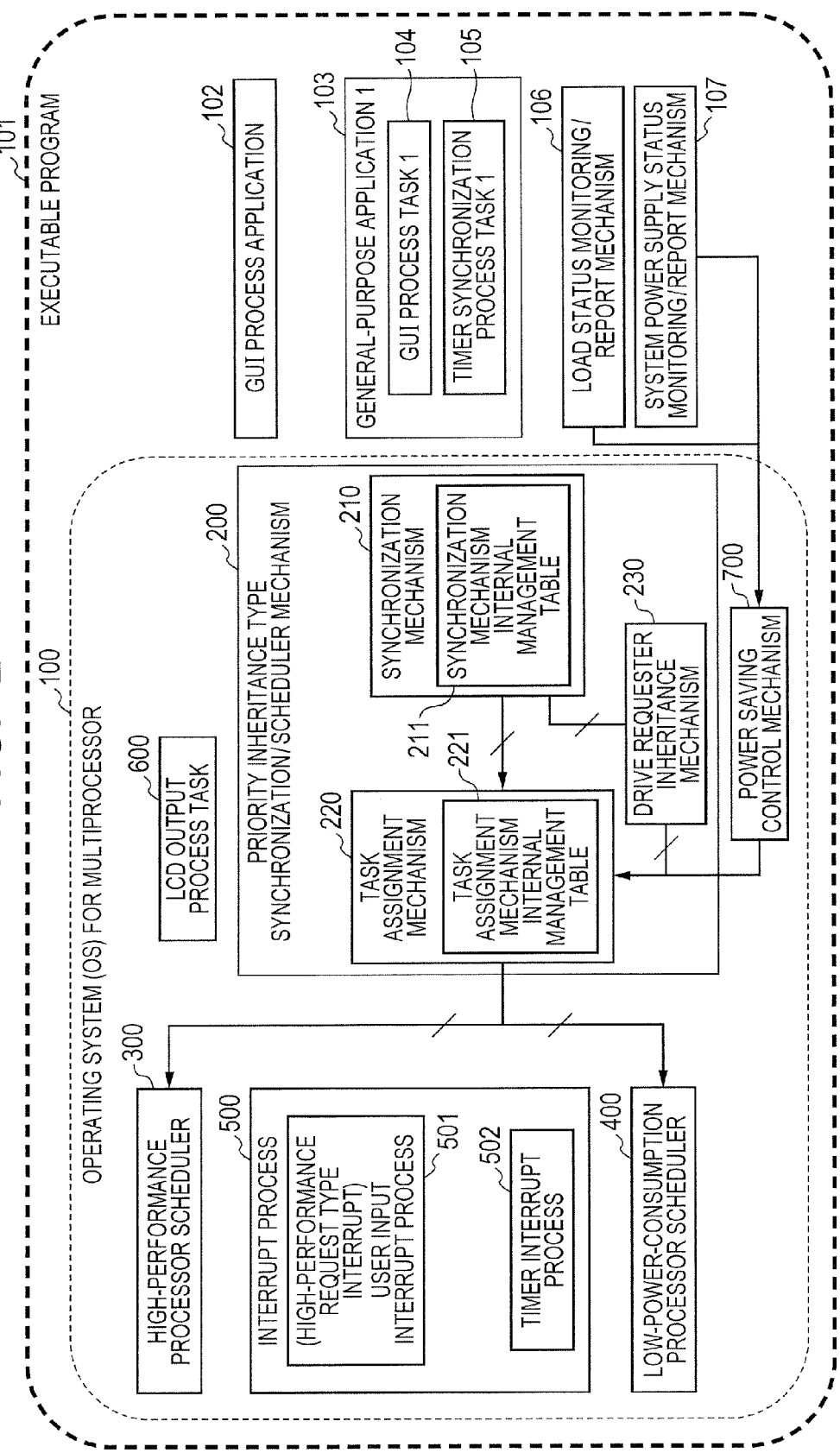
FIG. 2 is an explanatory diagram illustrating a configuration of software according to the first embodiment.

FIG. 2 is an explanatory diagram illustrating a configuration of software 101 according to the first embodiment. The software (executable program) 101 to be executed by the data processing device 10 is loaded into the main storage device 1, and executed by either one of the high-performance processor 2 and the low-power-consumption processor 3 or executed cooperatively by both of them. The executable program 101 includes various application programs and an operating system (OS) 100 for a multiprocessor. The various application programs are, for example, a GUI process application 102 and a general-purpose application 103. The general-purpose application 103 includes a GUI process task 104 and a timer synchronization process task 105. The executable program 101 may additionally include a load status monitoring/report mechanism 106 and a system power supply status monitoring/report mechanism 107. FIG. 2 indicates that these mechanisms are application programs not included in the OS 100. However, they may alternatively be included in the OS 100.

The operating system (OS) 100 for a multiprocessor includes a priority inheritance type synchronization/scheduler mechanism 200, a high-performance processor scheduler 300, a low-power-consumption processor scheduler 400, an interrupt process 500, an LCD output process task 600, and a power saving control mechanism 700.

The priority inheritance type synchronization/scheduler mechanism 200 includes a synchronization mechanism 210 having a management table 211, a task assignment mechanism 220 having a management table 221, and a drive requester inheritance mechanism 230. Although the operation of the priority inheritance type synchronization/scheduler mechanism 200 will be described later, the priority inheritance type synchronization/scheduler mechanism 200 is capable of dynamically assigning tasks in a proper manner because it is configured as a "priority inheritance type". The high-performance processor scheduler 300 and the low-power-consumption processor scheduler 400 each have a task queue, place tasks assigned by the priority inheritance type synchronization/scheduler mechanism 200 in the task queue, and perform scheduling so that the tasks are sequentially executed by the high-performance processor 2 and the low-power-consumption processor 3.

In accordance with the load and power status of the system, which is supplied from the load status monitoring/report mechanism 106 and the system power supply status monitoring/report mechanism 107, the power saving control mechanism 700 provides power saving control of the entire data processing device 10, which is a multiprocessor system. In addition, the power saving control mechanism 700 supplies information for defining a task assignment operation of the task assignment mechanism 220. This operation will be described later.

The interrupt process 500 includes a user input interrupt process 501, which is an interrupt that requires high performance, and a timer interrupt process 502, which requires relatively low performance. The user input interrupt process 501 is an interrupt process for an LCD synchronization interrupt request or a touch panel interrupt request, which are shown, for instance, in FIG. 1 and is required to make a response as fast as possible. Therefore, it is classified as an interrupt that requires high performance. The timer interrupt process 502 is an interrupt process for a timer interrupt request shown, for instance, in FIG. 1. Thus, a process to be executed at predetermined intervals is driven. Hence, the timer interrupt process 502 is required to exhibit lower performance than the above-mentioned interrupt that requires high performance.

The LCD output process task 600 controls the LCD 7 through the LCD controller 6 shown in FIG. 1 and outputs an LCD output, which is display data, to the LCD 7. The LCD output process task 600 is implemented as a device driver in the operating system (OS) 100. Although not shown, some other device drivers, such as a task that controls the touch panel 8, are implemented as needed in the OS 100.

An exemplary configuration and operation of the priority inheritance type synchronization/scheduler mechanism 200 will now be described.

FIG. 3 is an explanatory diagram illustrating an exemplary configuration of the synchronization mechanism internal management table 211 and an operation of the synchronization mechanism 210. The synchronization mechanism internal management table 211 includes a plurality of synchronization structures 212_1 to 212_n (n is an arbitrary natural number) and a task priority management table 213. A driven task, which is to be subsequently driven when the process of a certain synchronizing task is completed, is defined in association with the synchronization structures 212_1 to 212_n. Information indicating whether each driven task is a single context, that is, whether the simultaneous operation of a plurality of driven tasks is permitted, is also defined. In the task priority management table 213, priorities 214_1 to 214_m (m is an arbitrary natural number) assigned to individual tasks are defined. When a synchronizing task completes its process, a synchronization structure for the synchronizing task is referenced, and the priority of the synchronizing task, which is defined in the task priority management table 213, is copied to a priority assigned to a driven task in the task priority management table 213 for inheritance purposes. FIG. 3 indicates that the driven task is task Y when a first synchronization structure 212_1 is referenced upon completion of task X, which is a synchronizing task. When the priority of task Y is changed to be equal to the priority of task X in the task priority management table 213, the priority is inherited from task X, which is a synchronizing task, to task Y, which is a driven task.

FIG. 4 is an explanatory diagram illustrating an exemplary configuration of the task assignment mechanism internal management table 221. In the task assignment mechanism internal management table 221, assigned processors are defined in accordance with the priority of a driven task. A driven task having high priority is assigned to the high-performance processor 2. A driven task having low priority is assigned to the low-power-consumption processor 3. FIG. 4 also shows an example in which this assignment standard is adjustable in accordance with the power and load status of the system. When a value indicative of the power and load status of the system is maximized, it is prescribed that as many tasks as possible be assigned to the high-performance processor 2. When, on the other hand, the value indicative of the power and load status of the system is minimized, it is prescribed that as many tasks as possible be assigned to the low-power-consumption processor 3. Here, a state where the value indicative of the power and load status of the system is maximized is a state where, for example, a heavy load can be imposed on a processor as the battery is fully charged or being charged and capable of supplying a more than adequate amount of electrical power. On the other hand, a state where the value indicative of the power and load status of the system is minimized is a state where, for example, a heavy load cannot be imposed on a processor as the battery is almost empty and is not capable of supplying a more than adequate amount of electrical power. When the power and load status of the system is quantified as appropriate, processor assignments can be adjusted in a stepwise fashion in accordance with driven task priorities. This makes it possible to exercise power consumption management in a precise manner.

The present example assumes that, in application A, driven task Y is driven by synchronizing task X. It is also assumed that, in application B, task Y is a driven task driven by synchronizing task Z. In this instance, it is further assumed that application A requires a high-performance process as the amount of processing time available for it is small, and that application B may be handled by a relatively-low-performance process as the amount of processing time available for it is large. It is expected that tasks included in application A will be executed with high priority, and that tasks included in application B will be executed with low priority. When application A starts, a high priority is given to a first task, and the above-described configuration ensures that the high priority is sequentially inherited by a plurality of sequentially driven tasks included in application A. Therefore, in application A, the high priority is inherited from synchronizing task X to task Y, which is a driven task, and then processor assignments are determined accordingly.

On the other hand, tasks included in application B sequentially inherit a low priority. Therefore, the low priority is inherited to the same task Y from task Z, which is a synchronizing task.

Consequently, even a driven task commonly used by a plurality of applications can be properly assigned to a high-performance processor or to a low-power-consumption processor.

Although FIG. 1 indicates that the data processing device 10 includes, for example, the LCD 7, the touch panel 8, and the timer 9 as peripheral devices, such peripheral devices are merely examples and may be changed as needed. Further, the bus arrangement may be changed as desired, for example, to a hierarchical structure. Furthermore, although the present example assumes that two processors, namely, the high-performance processor and the lower-power-consumption processor, are included in the multiprocessor, an alternative configuration may be employed so that the performance and power consumption are adjusted by changing the power supply voltage and clock frequency for processors having the same circuit configuration. In such an instance, operating modes may be provided to permit both processors to operate in high performance mode or in low power consumption mode. Moreover, the number of processors included in the multiprocessor is not limited to two. Alternatively, three or more processors may be included in the multiprocessor. It is preferred that the same instruction set be used for a plurality of processors included in the multiprocessor, and that the same instruction code be executable by any processor. The OS 100 may be executed cooperatively by the processors or executed by one of the processors.

In the above description, the terms "application" and "task" are merely used to represent the hierarchy of software. These terms simply indicate a hierarchical structure in which a plurality of tasks are included in an application. When the term "application" is used as a general term, it may indicate a situation where tasks having a plurality of priorities are respectively generated to run while sequentially generating a "process" and a "thread". In such a situation, the tasks correspond to the "application" in the present invention, and the process and the thread correspond to the tasks in the present invention.

Second Embodiment

A second embodiment of the present invention will now be described. Examples of operations performed when the data processing device 10 includes, for example, the LCD 7, the touch panel 8, and the timer 9 as peripheral devices as shown in FIG. 1 will now be described in further detail.

As described earlier, the interrupt controller 5 receives an interrupt request, for instance, from the LCD 7, the touch panel 8, or the timer 9, which are coupled to the interrupt controller 5, and notifies the high-performance processor 2 or the low-power-consumption processor 3 of the interrupt request in accordance with the interrupt notification destination table 51 and with the cause of an interrupt.

Upon receipt of an interrupt request from the touch panel 8, the interrupt controller 5 notifies the high-performance processor 2 of the interrupt request in accordance with the interrupt notification destination table 51. When the executable program 101 shown in FIG. 2 is notified of the interrupt request, the interrupt is received by the interrupt process 500 in the operating system (OS) 100 for a multiprocessor. When the interrupt process 500 determines that the cause of the interrupt is a touch panel interrupt request, the user input interrupt process 501 is driven. The user input interrupt process 501 processes data input from the touch panel 8, for example, data such as touch coordinates.

When the user input interrupt process 501 is completed, the GUI process application 102 is notified of the process completion through the synchronization mechanism 210, and the data processed by the user input interrupt process 501 is delivered separately or simultaneously to the GUI process application 102. The GUI process application 102 drives the GUI process task 104 included in the general-purpose application 103 through the synchronization mechanism 210. After a screen image to be output is created by the GUI process task 104, the LCD output process task 600 is driven through the synchronization mechanism 210. The LCD output process task 600 operates the LCD controller 6 to update the LCD output.

In the above example of touch panel interrupt processing, it is preferred that the above process be entirely executed by the high-performance processor 2 in order to promptly update the LCD output in response to an input to the touch panel.

An example in which a timer interrupt is received will now be described.

Upon receipt of an interrupt request from the timer 9 shown in FIG. 1, the interrupt controller 5 notifies the low-power-consumption processor 3 of the interrupt request in accordance with the interrupt notification destination table 51. When the executable program 101 shown in FIG. 2 is notified of the interrupt request, the interrupt is received by the interrupt process 500 in the operating system (OS) 100 for a multiprocessor. When the interrupt process 500 determines that the cause of the interrupt is a timer interrupt request, the timer interrupt process 502 is driven.

The timer interrupt process 502 performs, for example, a battery monitoring process or other periodic process.

When the timer interrupt process 502 is completed, the timer synchronization process task 105 included in the general-purpose application 103 is driven through the synchronization mechanism 210.

In the above example of timer interrupt processing, it is preferred that the above process be entirely executed by the low-power-consumption processor 3 as the required processing speed is assumed to be low.

A configuration required to obtain a preferred operation from the second embodiment will now be described.

The required configuration is such that the following setup is performed in advance when the operating system (OS) 100 for a multiprocessor is initialized. An alternative configuration may be employed so as to perform dynamic setup during a system operation.

The processor to be notified of an interrupt request is defined in the interrupt notification destination table 51. The definition is made for each cause of an interrupt request. In the present example, the definition is made so that a touch panel interrupt request is sent to the high-performance processor 2, and that a timer interrupt request is sent to the low-power-consumption processor 3.

The definition is also made so that the user input interrupt process 501 is driven when the interrupt process 500 determines that a touch panel interrupt request is generated. The definition is further made so that the timer interrupt process 502 is driven when the interrupt process 500 determines that a timer interrupt request is generated.

A drive destination defined in the interrupt process 500 should preferably be such that each interrupt process is surely executed by a certain processor in preparation for a situation where interrupt request settings in the interrupt notification destination table 51 are dynamically changed later. More specifically, even when a touch panel interrupt request is input to the low-power-consumption processor 3 or a timer interrupt request is input to the high-performance processor 2, the employed configuration should preferably be such that interrupt processes are normally performed and that each interrupt process is performed by a processor that has received an associated interrupt request.

The employed configuration is such that the following setup is performed in advance or dynamically in the operating system (OS) 100 for a multiprocessor, in the initialization of the GUI process application 102, or in an arbitrary task.

When a preceding interrupt process or task is completed, in the synchronization structures 212_1 to 212_n of the synchronization mechanism internal management table 211 existing in the synchronization mechanism 210, the preceding task is registered as a "synchronizing task" and the next task to be driven is registered as a "driven task". In the present example, it is assumed that the i-th synchronization structure 212_i is used (i is an arbitrary natural number not greater than the natural number n). In an example, the synchronizing task is a user input interrupt process 501 in the above example, and the driven task is a GUI process application 102. This combination is registered in the first synchronization structure 212_1. In a second synchronization structure 212_2, the GUI process application 102 is registered as a synchronizing task, and the GUI process task 104 is registered as a driven task. As described above, the interrelationship between sequentially driven tasks can be referenced due to the synchronization structures 212_1 to 212_n.

The priority order of each task is registered in the j-th task priority 214_j (j is an arbitrary natural number not greater than the natural number m). It is assumed that the task priority of each task is dynamically changed. For example, the employed configuration is such that the task priority of the user input interrupt process 501 is managed as 214_1, and that the task priority of the GUI process application 102 is managed as 214_m. The initial value of each task priority is not defined in the second embodiment. However, it is set or changed at a stage where a steady operating state begins.

The following describes a configuration that prevails when the entire data processing device 10 is in the steady operating state after completion of initialization.

The load status monitoring/report mechanism 106 notifies the power saving control mechanism 700 of a system status such as the load status of the entire system and a thermal design allowance for heat generation. The system power supply status monitoring/report mechanism 107 notifies the power saving control mechanism 700 of the system status such as a state where available electrical power is more than adequate (an operation is performed while a battery for a battery-driven system is fully charged or a state where an operation is performed by using commercially available electrical power) or a state where the supply of electrical power is inadequate (an operation is performed while the remaining battery power for a battery-driven system is becoming inadequate).

The power saving control mechanism 700 notifies the later-described task assignment mechanism 220 of the system status. If the high-performance processor scheduler 300 does not detect any task to be processed due to the system status such as a state where available electrical power is inadequate, the high-performance processor 2 is stopped, for instance, by controlling the power supply controller 4 or placed in an intermittent mode until its processing is requested again.

The power saving control mechanism 700 is preferably capable of manipulating the interrupt notification destination table 51 to change the notification destination of each input in accordance with the system status. For example, if each input needs to be promptly processed in a situation where a heavy load is imposed on the entire system or the amount of available electrical power is not limited or if only a particular input needs to be promptly processed in a situation where the amount of available electrical power is inadequate or a light load is imposed on the entire system, the power saving control mechanism 700 manipulates the interrupt notification destination table 51 to change the notification destination of each input.

The following describes a configuration that is required for processing when a touch panel interrupt request is input during a steady state.

Figure 5:
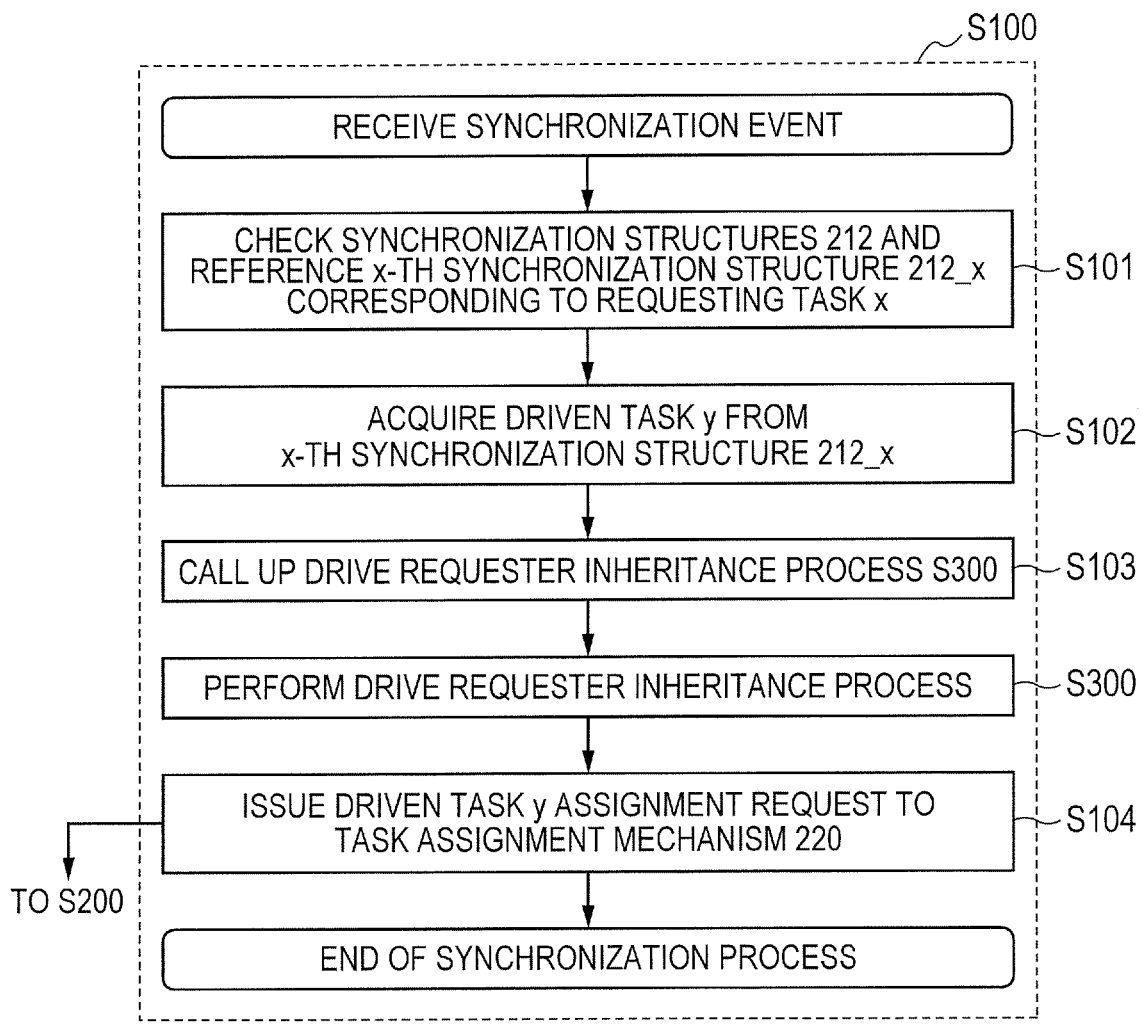
FIG. 5 is a flowchart illustrating an example of a synchronization process performed by the synchronization mechanism.
Figure 6:
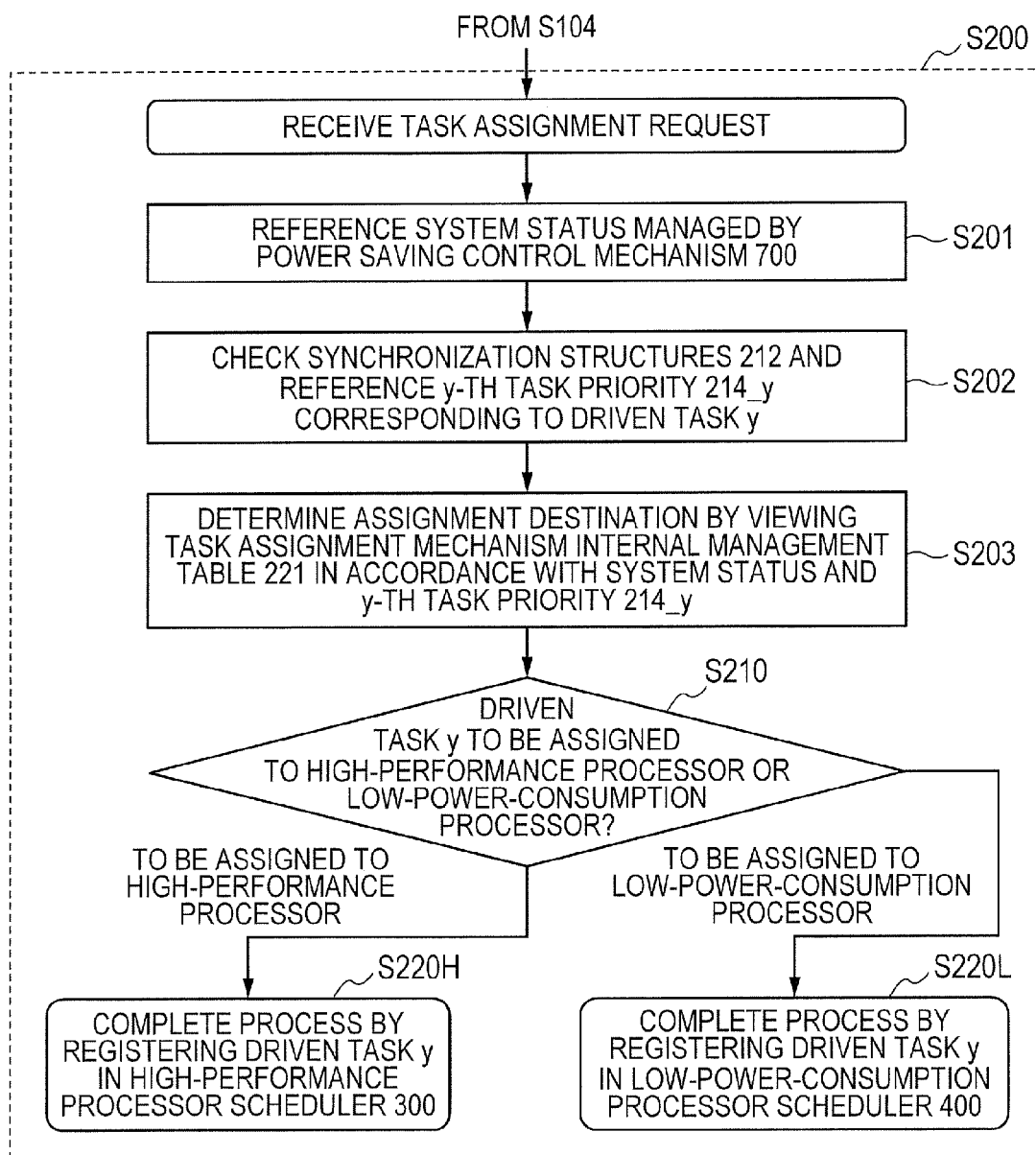
FIG. 6 is a flowchart illustrating an example of a task assignment process performed by a task assignment mechanism.
Figure 7:
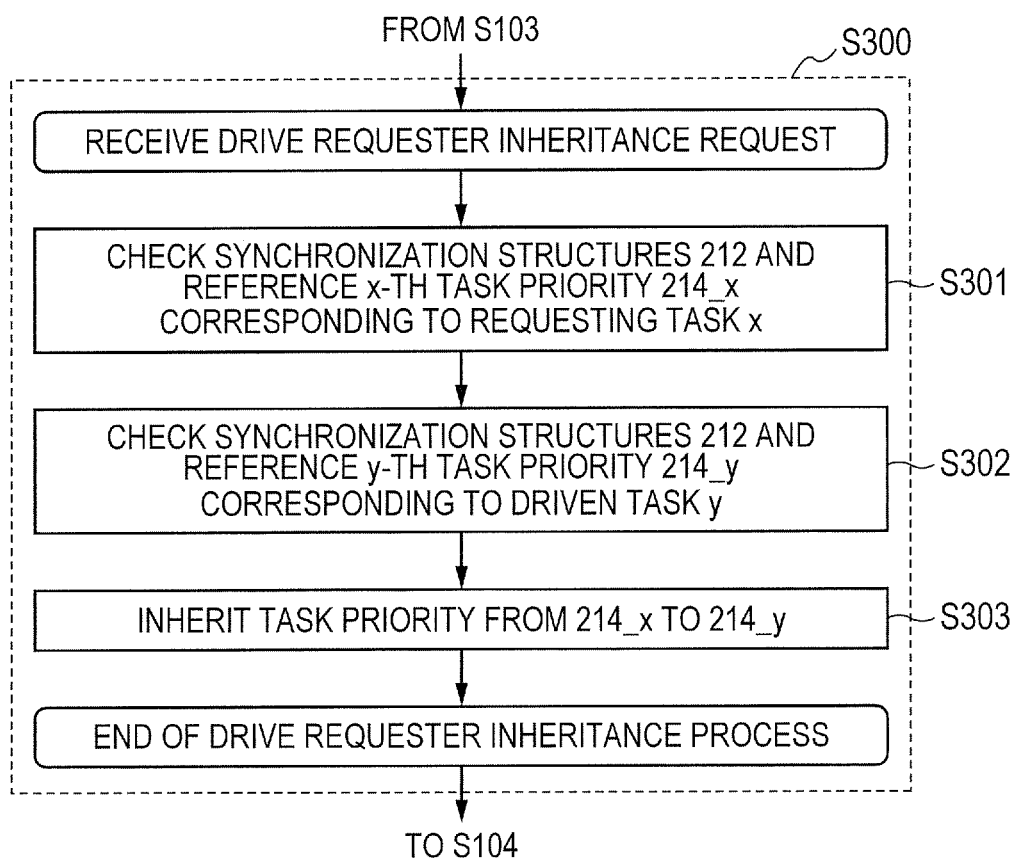
FIG. 7 is a flowchart illustrating an example of a drive requester inheritance process performed by a drive requester inheritance mechanism.

FIG. 5 is a flowchart illustrating an example of a synchronization process S100 performed by the synchronization mechanism 210. FIG. 6 is a flowchart illustrating an example of a task assignment process S200 performed by the task assignment mechanism 220. FIG. 7 is a flowchart illustrating an example of a drive requester inheritance process S300 performed by the drive requester inheritance mechanism 230.

When, in the above example, the process of a synchronizing task (the user input interrupt process 501) progresses, an event that activates the next task to be processed (the GUI process application 102) is sent to the priority inheritance type synchronization/scheduler mechanism 200. The synchronization mechanism 210 in the priority inheritance type synchronization/scheduler mechanism 200 starts the synchronization process S100. In the present example, the user input interrupt process 501 is executed by the high-performance processor 2 in accordance with the definition in the interrupt notification destination table 51. As regards a touch panel interrupt request, which is to be promptly processed, the task priority 214_x (not shown) of a user input interrupt request in the synchronization mechanism internal management table 211 is set high. In the present example, the synchronization process S100 of the synchronization mechanism 210 is executed in the above state.

In the synchronization mechanism 210, a requesting task x references the x-th synchronization structure 212_x, which is one of the synchronization structures 212 (the reference numeral 212 is used to denote the whole set of the synchronization structures 212_1 to 212_n ) (S101), and the GUI process application 102 is acquired as a driven task y. Next, the drive requester inheritance process S300, which is to be performed by the drive requester inheritance mechanism 230, is called up (S103).

The drive requester inheritance mechanism 230 operates (S300) so that the task priority 214_x of a synchronizing task is inherited to the task priority 214_y of the GUI process application 102 (S301 to S303). As a result, the task priority 214_y of the GUI process application 102 is set high.

The drive requester inheritance process S300 will now be described in further detail with reference to FIG. 7. When a drive requester inheritance request is received, the synchronization structures 212 are checked to reference the x-th task priority 214_x corresponding to the requesting task x (S301), and then the synchronization structures 212 are checked to reference the y-th task priority 214_y corresponding to the driven task y (S302). Next, the task priority is inherited from 214-x to 214_y (S303). The drive requester inheritance process S300 is now completed, and processing returns to the synchronization process S100. In the synchronization process S100, an assignment request for the driven task y is issued to the task assignment mechanism 220 (S104). The synchronization process (S100) is now completed.

When the above processing sequence is performed, the GUI process application 102 is selected as the driven task y, and then the task assignment mechanism 220 resumes its task assignment process S200 while the task priority is set high.

The task assignment process S200 will now be described in detail with reference to FIG. 6. In the task assignment process S200, when a task assignment request is received, the system status managed by the power saving control mechanism 700 (S201) is first referenced. Then, the synchronization structures 212 are checked to reference the y-th task priority 214-yi corresponding to the driven task y (S202). Next, an assigned processor is determined (S203) by viewing the task assignment mechanism internal management table 221 in accordance with the system status acquired at S201 and with the y-th task priority 214_y acquired at S202. Whether the driven task y is assigned to a high-performance processor or a low-power-consumption processor is determined (S210). If the result of determination indicates that the driven task y is assigned to a high-performance processor, the driven task y is registered in the high-performance processor scheduler 300 to complete the task assignment process S200 (S220H). If, on the other hand, the result of determination indicates that the driven task y is assigned to a low-power-consumption processor, the driven task y is registered in the low-power-consumption processor scheduler 400 to complete the task assignment process S200 (S220L).

As described above, the task assignment mechanism 220 references the task assignment mechanism internal management table 221 in accordance with the priority of a driven task (high priority in the present example) and with the system status input from the power saving control mechanism 700 and determines the processor to which the driven task y is to be assigned (S201-S203, S210). In the present example, as shown in FIG. 4, the high-performance processor 2 is selected for the GUI process application 102 having a high priority except when the power plus load status value is minimized (S220H). After the task assignment mechanism 220 decides to assign the driven task (the GUI process application 102 in the present example) to the high-performance processor (S210), the driven task is registered in the associated processor scheduler (the high-performance processor scheduler 300 in the present example) (S220H). In accordance with task processing status, the high-performance processor scheduler 300 causes the high-performance processor 2 to actually process the GUI process application 102.

In the above example, a touch panel interrupt request is used to let the high-performance processor 2 execute the user input interrupt process 501. However, the same holds true for a case where a timer interrupt request is used to let the low-power-consumption processor 3 execute the timer interrupt process 502. In the timer interrupt process 502, the priority of an initial synchronizing task is set low. Therefore, the drive requester inheritance mechanism 230 causes the subsequently-driven task y to inherit a low priority (S303). The task assignment mechanism 220 then registers the timer synchronization process task 105 in the low-power-consumption processor scheduler 400 as the driven task y (S220L).

In the second embodiment, the drive requester inheritance mechanism 230 operates so that the task priority of a requesting task is dynamically inherited to the task priority of a driven task when the requesting task passes processing to the driven task. Therefore, if, for instance, the high-performance processor 2 drives the GUI process application 102 in the second embodiment from the user input interrupt process 501, control is exercised so that the GUI process application 102 is driven with high priority by the high-performance processor 2. On the other hand, if the low-power-consumption processor 3 drives the same GUI process application 102 from the timer interrupt process 502, low priority is inherited to exercise control so that the GUI process application 102 is driven by the low-power-consumption processor 3. As described above, the processor to be assigned when each task is to be driven is dynamically determined by the priority inheritance type synchronization/scheduler mechanism 200 in accordance with a synchronizing task such as an interrupt process that is an input of the associated process.

As described earlier, the interrupt notification destination table 51 may dynamically control the assignment of the high-performance processor 2 or low-power-consumption processor 3 to each type of interrupt to be coupled. The same process is performed even when task activation in the second embodiment is not initiated by an interrupt from an input device but is initiated by an event transmission for software generation to the priority inheritance type synchronization/scheduler mechanism 200 by an arbitrary task.

As described above, some inputs (interrupts) that require high performance are consistently processed by the high-performance processor while normal inputs (interrupts) are processed by the low-power-consumption processor to halt or stop the high-performance processor. This makes it possible to deliver adequate processing performance to inputs requiring high performance and reduce the overall power consumption of the system.

Individual applications that process inputs and individual tasks in the OS and applications are dynamically assigned by the priority inheritance type synchronization/scheduler mechanism. The same task can be used in a process for inputs requiring high performance and in a process for the other inputs without preparing individual tasks statically and multiply for the high-performance processor and the low-power-consumption processor.

Third Embodiment

A third embodiment of the present invention will now be described. Process groups are formed of a single task or of a plurality of tasks. Sub-process groups, which each include a single task or a plurality of tasks coordinated by a synchronization process, are formed in each process group. A task may be assigned in a fixed manner to each sub-process group in a process group. However, each sub-process group in a process group that is to be assigned in a non-fixed manner may be removed from one process group to another in accordance, for instance, with the coordination of a task included in each sub-process group with another task in the synchronization mechanism and with changes in the used/unused state of an input/output destination.

In the third embodiment, the n-th priority ($214\_n$) in the first embodiment is shared by tasks included in a sub-process group. Further, a sub-process group management governor 800 (not shown) is added into the operating system (OS) 100. The sub-process group management governor 800 dynamically assigns priorities to the individual sub-process groups in accordance with the type of a cause (input) activating a task in a sub-process group, with the input capacity and type determining the length of calculation time, or with the priority of each task managed by the OS 100.

The priorities dynamically assigned to each sub-process group by the sub-process group management governor 800 are referenced as the priorities 214 of individual tasks in a sub-process group by the task assignment mechanism 220 and the drive requester inheritance mechanism 230. Therefore, the priority of a sub-process group to which a requesting task belongs is inherited to a sub-process group to which a driven task belongs (S303). Subsequently, a process in the task assignment mechanism 220 performs task assignment (S203) to register the driven task in the high-performance processor scheduler 300 or the low-power-consumption processor scheduler 400 (S220H or S220L).

As described above, the OS 100 according to the third embodiment determines the assignment of each task to the high-performance processor or the low-power-consumption processor on an individual sub-process group basis. In contrast to the first and second embodiments, which determine the assignment at a timing of input, the third embodiment provides a high degree of freedom in the timing of assignment determination. In the third embodiment, therefore, an assignment destination may be determined intermittently by conducting a periodic priority review at a timing other than the timing of input or synchronization mechanism activation.

In the third embodiment, when the priorities of some of the tasks in a sub-process group are set or changed, the priorities of all the tasks in the sub-process group are changed accordingly. Therefore, even if the synchronization process is not performed between tasks directly through the priority inheritance type synchronization/scheduler mechanism 200, the assignment of the tasks to the high-performance processor 2 or the low-power-consumption processor 3 can be synchronized between the tasks.

If, for instance, an LCD screen brightness management task (not shown) that does not directly synchronize with the LCD output process task 600 exists in the same sub-process group as the LCD output process task 600 in a situation where a task is driven by the user input interrupt process 501 according to the second embodiment, the priority of the LCD output process task 600 may differ from that of the LCD screen brightness management task (not shown) in the second embodiment. Therefore, changes in the output of the LCD 7 may not synchronize with changes in the screen brightness. In the third embodiment, however, the LCD output process task 600 and the LCD screen brightness management task (not shown) have the same priority. Therefore, these tasks are both assigned to the high-performance processor so that synchronized operations can be performed.

Fourth Embodiment

A fourth embodiment of the present invention will now be described. A function of the operating system 100 for a multiprocessor permits one task to operate on a plurality of contexts. In the first to third embodiments, which have been described earlier, when a subsequent driven task is driven by the priority inheritance type synchronization/scheduler mechanism 200, the subsequent driven task can operate on a plurality of contexts in the unit of synchronization. Further, the subsequent driven task can be assigned to the high-performance processor or the low-power-consumption processor as an independent context in accordance with the priority, power status, and load status prevailing when the subsequent task is driven. More specifically, each task, such as the GUI process application 102, can operate on a plurality of contexts as an independent task in the high-performance processor 2 and in the low-power-consumption processor 3.

However, all operating systems 100 for a multiprocessor do not necessarily have such a function. The fourth embodiment is an embodiment in which all or some tasks merely operate on a single context or on a small number of contexts that are less than the unit of synchronization. For the sake of simplicity, the following describes a case where a certain task operates on a single context and is allowed to exist in only one of all processors at a certain point of time. In this instance, a task identical with a task operating in the low-power-consumption processor may be driven under conditions derived from a high-priority input.

Figure 8:
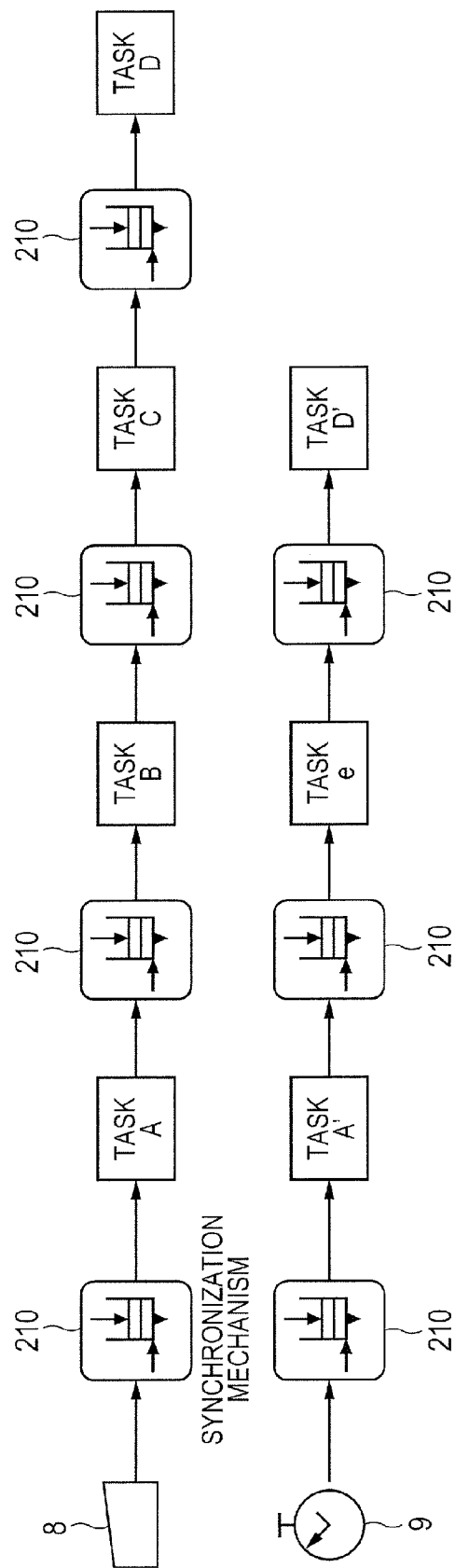
FIG. 8 is a schematic explanatory diagram illustrating how synchronization is achieved between tasks.

FIG. 8 is a schematic explanatory diagram illustrating how synchronization is achieved between tasks. In response to a touch panel interrupt request input from the touch panel 8, task A, task B, task C, and task D are sequentially driven. In parallel with such a sequential drive, task A', task e, and task D' are sequentially driven in response to a timer interrupt request input from the timer 9. In this case, it is assumed that task A and task A' can simultaneously operate on a plurality of contexts, and that task D and task D' operate on a single context.

Figure 9:
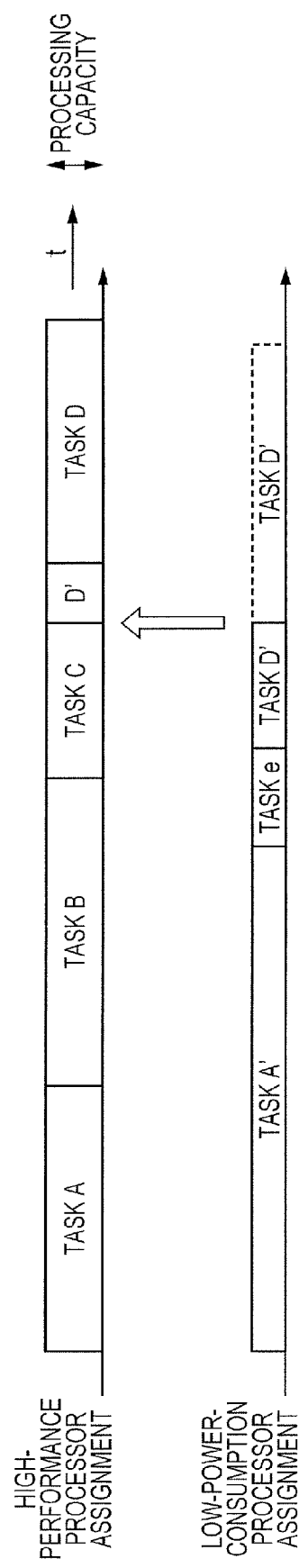
FIG. 9 is a schematic explanatory diagram illustrating how an assignment change is applied to a running task in a situation where synchronization is achieved between tasks.

FIG. 9 is a schematic explanatory diagram illustrating how an assignment change is applied to a running task in a situation where synchronization is achieved between tasks. It is assumed that a series of tasks related to a touch panel interrupt request are assigned to the high-performance processor 2, and that a series of tasks related to a timer interrupt request are assigned to the low-power-consumption processor 3. In FIG. 9, the horizontal axis represents time and the vertical axis represents the processing capacity of each processor. The high-performance processor 2 has a higher processing capacity than the low-power-consumption processor 3. When related to a touch panel interrupt request, task A is assigned to the high-performance processor 2. When related to a timer interrupt request, task A is assigned to the low-power-consumption processor 3 as task A', which is a different context. Although task A and task A' are identical with each other, when task A is assigned to the high-performance processor 2 for processing purposes, task (context) processing is completed in a shorter period of time than when task A' is processed by the low-power-consumption processor 3 as a task having a different context. Subsequently, the low-power-consumption processor 3 sequentially drives task e and task D'. In parallel with such a sequential drive, the high-performance processor 2 sequentially drives task B and task C and attempts to drive task D upon completion of task C. At that point of time, however, task D', which is one context of task D, is already executed by the low-power-consumption processor 3. If, in this instance, the high-performance processor 2 is forced to wait until the low-power-consumption processor 3 completes the processing of task D', the high-performance processor 2 wastes its processing time. This may not only decrease the efficiency of resource use but also result in the failure to meet temporal performance requirements concerning a touch panel interrupt request. Under the above-described circumstances, the fourth embodiment causes the low-power-consumption processor 3 to change the assignment of running task D'. More specifically, task D' is assigned to the high-performance processor 2 to let the high-performance processor 2 complete the remaining process of task D' and then execute assigned task D, which is driven by task C.

Let us assume, for instance, a case where the GUI process task 104 is driven from the timer interrupt process 502 and processed by the low-power-consumption processor 3, but has to be subsequently processed by the high-performance processor 2 due to a synchronization event originated from the user input interrupt process 501. Although the GUI process task 104 has to be processed by the high-performance processor 2, the high-performance processor 2 and the low-power-consumption processor 3 cannot simultaneously perform a plurality of sessions due to the implementation of the GUI process task 104. Therefore, a process related to the user input interrupt process 501 has to wait until a process related to the timer interrupt process 502 is completed.

In the fourth embodiment, as shown in FIG. 3, each of the synchronization structures 212_1 to 212_n, which are referenced by the synchronization process 210 in the priority inheritance type synchronization/scheduler mechanism 200, is provided with a flag that indicates whether the next task to be driven is formed of a single context.

Figure 10:
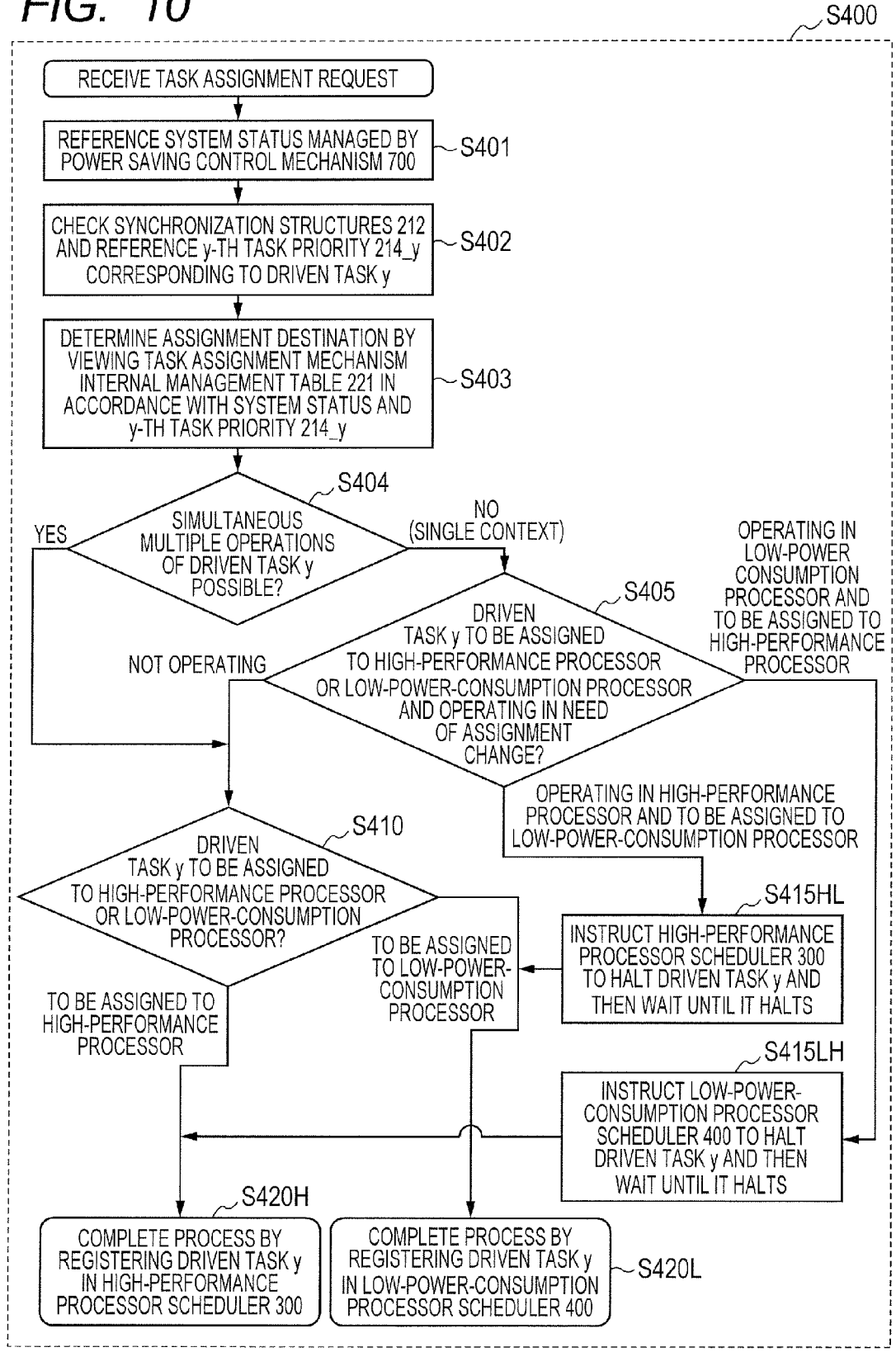
FIG. 10 is a flowchart illustrating an example of a task assignment process performed by the task assignment mechanism according to a fourth embodiment of the present invention.

FIG. 10 is a flowchart illustrating an example of a task assignment process S400 performed by the task assignment mechanism 220 according to the fourth embodiment. Upon receipt of a task assignment request, the task assignment mechanism 220 references the system status managed by the power saving control mechanism 700 (S401). Next, the task assignment mechanism 220 checks the synchronization structures 212 to reference the y-th task priority 214_y corresponding to the driven task y (S402). Next, the task assignment mechanism 220 views the task assignment mechanism internal management table 221 in accordance with the system status acquired at S401 and with the y-th task priority acquired at S402, and determines an assigned processor (S403). Next, the task assignment mechanism 220 views the flags attached to the synchronization structures 212_1 to 212_n in order to determine whether the driven task y permits a simultaneous operation of a plurality of sessions and is formed of a single context (S404). If the driven task y is formed of a single context, the task assignment mechanism 220 determines whether the driven task y is assigned to the high-performance processor or the low-power-consumption processor and is running and in need of an assignment change (S405).

If the result of determination at S405 indicates that the driven task y is not running in the other processor in a situation where the result of determination at S404 indicates that the driven task y permits an operation of a plurality of sessions or is formed of a single context, the task assignment mechanism 220 determines whether the driven task y is assigned to the high-performance processor 2 or the low-power-consumption processor 3 (S410). If the result of determination indicates that the driven task y is assigned to the high-performance processor 2, the task assignment mechanism 220 registers the driven task y in the high-performance processor scheduler 300 to complete the task assignment process S400 (S420H). If, on the other hand, the result of determination indicates that the driven task y is assigned to the low-power-consumption processor 3, the task assignment mechanism 220 registers the driven task y in the low-power-consumption processor scheduler 400 to complete the task assignment process S400 (S420L).

If the result of determination at S405 indicates that the driven task y is already running in the low-power-consumption processor and is assigned to the high-performance processor, the task assignment mechanism 220 instructs the low-power-consumption processor scheduler 400 to temporarily halt the driven task y and waits until it is halted (S415LH). After the driven task y is halted in the low-power-consumption processor 3, the task assignment mechanism 220 registers the driven task y in the high-performance processor scheduler 300 to complete the task assignment process S400 (S420H).

If the result of determination at S405 indicates that the driven task y is already running in the high-performance processor 2 and is assigned to the low-power-consumption processor 3, the task assignment mechanism 220 instructs the high-performance processor scheduler 300 to temporarily halt the driven task y and waits until it is halted (S415HL). After the driven task y is halted in the high-performance processor 2, the task assignment mechanism 220 registers the driven task y in the low-power-consumption processor scheduler 400 to complete the task assignment process S400 (S420L).

As described above, if the driven task is formed of a single context and is already running, the driven task is transferred from the high-performance processor or the low-power-consumption processor to the other processor in accordance with the priority of the driven task, the power status, and the load status (S415LH or S415HL).

Consequently, proper assignment can be achieved even if the priority of a task formed of a single context is changed. Task assignment can be achieved in a more appropriate manner by transferring a task processed by the low-power-consumption processor to the high-performance processor in accordance with a synchronization request from a requesting task having high priority or by transferring a task processed by the high-performance processor to the low-power-consumption processor in accordance, for instance, with a change in the system status.

While the embodiments of the present invention contemplated by its inventors have been described in detail, the present invention is not limited to the specific embodiments described above. It is to be understood that many variations and modifications of the present invention may be made without departing from the spirit and scope of the present invention.

What is claimed is:

1. A task scheduler mechanism executed by a multiprocessor system that is capable of executing a plurality of applications and equipped with a high-performance processor and a low-power-consumption processor, the applications each including a plurality of tasks that are driven by an input or sequentially driven by another task, the task scheduler mechanism comprising:
   a synchronization mechanism that causes a driven task to inherit a priority assigned to the input or a synchronizing task; and
   a task assignment mechanism that determines, in accordance with the inherited priority, whether to assign the driven task to the high-performance processor or to the low-power-consumption processor,
   wherein the synchronization mechanism includes a first management table that stores a priority assigned to each task and stores the synchronizing task in association with the driven task,
   wherein, in the first management table, the priority of the driven task is replaced by the priority of the synchronizing task to cause the driven task to inherit the priority assigned to the synchronizing task,
   wherein the first management table is capable of storing the association between the synchronizing task and the driven task as well as flag information indicating whether the driven task is capable of parallely operating on a plurality of contexts,
   wherein, when assigning a processor to a driven task, the task assignment mechanism references the flag information,
   wherein, if the driven task comprises a task formed of a single context, the task assignment mechanism is capable of exercising control to acquire an operating status of the task, and
   wherein, if the task is running, the task assignment mechanism is capable of exercising control to transfer the task from a processor running the task to another processor.

2. The task scheduler mechanism according to claim 1,
   wherein the applications each includes a sub-process group that includes a plurality of tasks, and
   wherein, when the priority of a particular task is to be changed in the first management table, the synchronization mechanism changes the priorities of the other tasks belonging to the same sub-process group as the particular task to a same priority as that of the particular task.

3. The task scheduler mechanism according to claim 1,
   wherein the task assignment mechanism assigns to the high-performance processor or to the low-power-consumption processor in accordance with the inherited priority and with a power and/or load status of the multiprocessor system.

4. The task scheduler mechanism according to claim 1,
   wherein the task assignment mechanism includes a second management table that stores a priority of a driven task in association with an assigned processor, and references the second management table to determine, in accordance with a priority inherited by the driven task, whether to assign to the high-performance processor or to the low-power-consumption processor.

5. The task scheduler mechanism according to claim 4,
   wherein the second management table stores the assigned processor in association with a combination of the priority of a driven task and a power and/or load status of the multiprocessor system, and
   wherein the task assignment mechanism references the second management table to assign to the high-performance processor or to the low-power-consumption processor in accordance with the inherited priority and with the power and/or load status of the multiprocessor system.

6. The task scheduler mechanism according to claim 5,
   wherein the task scheduler mechanism further includes a load status monitoring/report mechanism and a system power supply status monitoring/report mechanism,
   wherein the load status monitoring/report mechanism monitors the load status of the multiprocessor system and supplies the monitored load status to the task assignment mechanism, and
   wherein the system power supply status monitoring/report mechanism monitors the status of power supply to the multiprocessor system and supplies the monitored power status to the task assignment mechanism.

7. The task scheduler mechanism according to claim 6,
   wherein the task scheduler mechanism further includes a power saving control mechanism, and
   wherein the power saving control mechanism receives the load status supplied from the load status monitoring/report mechanism and the power status supplied from the system power supply status monitoring/report mechanism and controls a power-consumption-related operating status of the high-performance processor and/or the low-power-consumption processor in accordance with the load status and with the power status.

8. An operating system comprising the task scheduler mechanism according to claim 1.

9. A multiprocessor system comprising the task scheduler mechanism according to claim 1.

10. A method of task scheduling, as executed by a multiprocessor system that is capable of executing a plurality of applications and equipped with at least one high-performance processor and at least one low-power-consumption processor, the applications each including a plurality of tasks that are driven by an input or sequentially driven by another task, the method comprising:

storing, in a first management table, a priority assigned to each task and synchronizing tasks in association with driven tasks; and replacing, in the first management table, the priority of the driven task by the priority of the synchronizing task, to cause the driven task to inherit the priority assigned to the synchronizing task;

causing a driven task to inherit a priority assigned to the input or a synchronizing task; and determining, in accordance with the inherited priority, whether to assign the driven task to the high-performance processor or to the low-power-consumption processor, wherein the applications each includes a sub-process group that includes a plurality of tasks, and, when the priority of a particular task is to be changed in the first management table, the priorities of the other tasks belonging to the same sub-process group as the particular task are changed to the same priority as that of the particular task, wherein the first management table is capable of storing the association between the synchronizing task and the driven task as well as flag information indicating whether the driven task is capable of parallelly operating on a plurality of contexts, and, when assigning a processor to a driven task, flag information is referenced, wherein, if the driven task comprises a task formed of a single context, an operating status of the task can be acquired, and, if the task is running, the task can be transferred from a processor running the task to another processor, and wherein tasks are assigned to the high-performance processor or to the low-power-consumption processor in accordance with the inherited priority and with the power and/or load status of the multiprocessor system.

* * * * *